United States Patent
Saito et al.

(10) Patent No.: US 8,038,512 B2
(45) Date of Patent: Oct. 18, 2011

(54) GLASS SUBSTRATE FOR INFORMATION RECORDING MEDIUM AND METHOD FOR MANUFACTURING SAME

(75) Inventors: Yasuhiro Saito, Osaka (JP); Toshiaki Hashimoto, Osaka (JP); Yuriko Kudoh, Osaka (JP)

(73) Assignee: Hoya Corporation, Tokyo (JP)

( * ) Notice: Subject to any disclaimer, the term of this patent is extended or adjusted under 35 U.S.C. 154(b) by 622 days.

(21) Appl. No.: 10/532,564

(22) PCT Filed: Oct. 22, 2003

(86) PCT No.: PCT/JP03/13460
§ 371 (c)(1),
(2), (4) Date: Aug. 17, 2005

(87) PCT Pub. No.: WO2004/042708
PCT Pub. Date: May 21, 2004

(65) Prior Publication Data
US 2006/0062129 A1    Mar. 23, 2006

(30) Foreign Application Priority Data
Oct. 23, 2002 (JP) ................................. 2002-308811

(51) Int. Cl.
*B24B 1/00* (2006.01)
*B24B 7/19* (2006.01)
*B24B 7/30* (2006.01)
*G11B 7/24* (2006.01)

(52) U.S. Cl. ............................... 451/54; 451/41; 451/59
(58) Field of Classification Search .................... 451/54, 451/41, 63, 61, 59; 252/79.5; 438/689–693, 438/734, 743; 216/2, 38, 36, 52
See application file for complete search history.

(56) References Cited

U.S. PATENT DOCUMENTS

| | | | |
|---|---|---|---|
| 5,934,980 A * | 8/1999 | Koos et al. ...................... 451/41 |
| 6,119,483 A * | 9/2000 | Takahashi et al. ............ 65/30.14 |
| 6,427,489 B1 * | 8/2002 | Eda et al. ...................... 65/30.14 |
| 6,428,396 B2 * | 8/2002 | Isono et al. ...................... 451/41 |
| 6,430,965 B2 * | 8/2002 | Eda et al. ...................... 65/30.14 |
| 6,440,531 B1 | 8/2002 | Kurachi et al. |
| 6,491,572 B1 * | 12/2002 | Horie et al. ...................... 451/63 |
| 6,568,995 B1 * | 5/2003 | Mitani et al. .................... 451/36 |
| 6,632,547 B2 * | 10/2003 | Shimada ...................... 428/848.8 |

(Continued)

FOREIGN PATENT DOCUMENTS

JP    5/342532    12/1993

(Continued)

OTHER PUBLICATIONS

U.S. Appl. No. 10/532,538, filed Apr. 22, 2004 entitled, "Glass Substrate for Information Recording Medium and Method for Manufacturing Same." (Related).

(Continued)

*Primary Examiner* — Joseph J Hail
(74) *Attorney, Agent, or Firm* — Workman Nydegger

(57) ABSTRACT

A method for manufacturing a glass substrate for an information recording medium having a high level of cleanness and superior smoothness. The manufacturing method includes washing a disk-shaped glass plate with an acid washing liquid, removing at least part of a surface layer, which is formed on the surface of the glass plate, by performing grinding with diamond abrasion grains, and washing the surface with a neutral or alkaline washing liquid.

22 Claims, 3 Drawing Sheets

U.S. PATENT DOCUMENTS

| | | | |
|---|---|---|---|
| 6,743,529 B2 * | 6/2004 | Saito et al. | 428/846.9 |
| 7,044,839 B2 * | 5/2006 | Maeda | 451/41 |
| 7,070,703 B2 * | 7/2006 | Benning et al. | 216/89 |
| 2001/0039810 A1 * | 11/2001 | Eda et al. | 65/30.14 |
| 2002/0016132 A1 * | 2/2002 | Isono et al. | 451/8 |
| 2002/0127432 A1 * | 9/2002 | Saito et al. | 428/694 SG |
| 2003/0003763 A1 * | 1/2003 | Kurachi et al. | 438/745 |
| 2003/0109202 A1 * | 6/2003 | Matsuno et al. | 451/41 |
| 2003/0110803 A1 * | 6/2003 | Saito et al. | 65/30.14 |
| 2004/0226745 A1 * | 11/2004 | En | 174/262 |

FOREIGN PATENT DOCUMENTS

| | | |
|---|---|---|
| JP | 10-194788 | 7/1998 |
| JP | 2001-002451 | 1/2001 |
| JP | 2001-026460 | 1/2001 |
| JP | 2001/294447 | 10/2001 |
| JP | 2001-316133 | 11/2001 |
| JP | 2001-341058 | 12/2001 |
| JP | 2002-092867 | 3/2002 |
| JP | 2002-123929 | 4/2002 |
| JP | 2002/133649 | 5/2002 |
| JP | 2002/150547 | 5/2002 |
| JP | 2002/251716 | 6/2002 |
| JP | 2002-237030 | 8/2002 |

OTHER PUBLICATIONS

U.S. Appl. No. 10/532,550, filed Apr. 22, 2005 entitled, "Glass Substrate for Information Recording Medium and Method for Manufacturing the Same." (Related).

* cited by examiner

GLASS SUBSTRATE FOR INFORMATION RECORDING MEDIUM AND METHOD FOR MANUFACTURING SAME

FIELD OF THE INVENTION

The present invention relates to a glass substrate for an information recording medium, such as a magnetic disk, a magneto-optical disk, or an optical disk, and a method for manufacturing the same. More particularly, the present invention relates to a glass substrate having a surface in which a texture extending in the circumferential direction is formed and to a method for manufacturing the same.

BACKGROUND OF THE INVENTION

A magnetic disk for a hard disk drive is known as one type of information recording medium. The magnetic disk is a disk having a center hole and is fabricated by superimposing magnetic films on the surface of a glass substrate. The magnetic disk is rotated by a spindle received in the center hole. Information recorded on the magnetic disk is read by a magnetic head, which moves along the surface of the magnetic disk in a state levitated from the surface by a certain distance.

It is desirable for the magnetic disk to have a high recording density to increase the recording capacity of the magnetic disk. Japanese Laid-Open Patent Publication No. 2002-150547 describes a method for smoothing the surface of a glass substrate to decrease the distance between the magnetic disk surface and the head and increase the recording density of the magnetic disk. More specifically, an abrasive that chemically affects the glass substrate, such as cerium oxide, is used to polish and smooth the surface of the glass substrate. An acid solution is used to remove foreign articles such as iron particles and abrasive particles adhered to the smooth surface (acid washing). Then, the surface of the glass substrate is etched with an alkaline solution (alkaline washing). The etching removes about 10 nm of the glass substrate.

Due to the demand for a magnetic disk having a higher recording density, there is a tendency for further decreasing the distance between the surface of the magnetic disk and the magnetic head. However, with the magnetic disk manufactured through the conventional method, the magnetic head cannot move further closer to the magnetic disk. More specifically, when alkaline washing removes about 10 nm of the glass substrate, the manufactured glass substrate may have deficiencies such as the etching being uneven, protuberances of abnormal heights being produced on the glass substrate, and the surface state differing locally (differences in the shapes of valleys and peaks). A magnetic disk manufactured from a deficient glass substrate has a tendency of causing a deficiency (glide error) such as the moving head crashing against or being caught by an abnormal protuberance.

To solve this problem, a weak acid solution or weak alkaline solution may be used when performing the washing. However, many iron particles and abrasive particles are chemically and firmly adhered to or caught in the surface of the glass substrate. Thus, all of the iron particles and abrasive particles cannot be washed off when using a weak acid solution or weak alkaline solution. In some cases, this would lower the cleanness of the glass substrate.

As another way to remove the iron particles and abrasive particles, the surface of the glass substrate may be polished with an abrasive after the acid washing. However, this method is not preferable in that the abrasion grains contained in the abrasive may adhere to the glass substrate and in that the surface of the glass substrate may be deformed by performing washing after the polishing.

SUMMARY OF THE INVENTION

It is an object of the present invention to provide a glass substrate having a smooth surface and a high cleanness.

One aspect of the present invention provides a glass substrate for an information recording medium formed from a disk-shaped glass plate made of a multi-component glass material containing at least silicon oxide. The glass plate includes a surface layer with an ingredient ratio of silicon oxide that is higher than an inner portion of the glass plate.

Another aspect of the present invention is a method for manufacturing a glass substrate for an information recording medium. The manufacturing method includes a first washing step for washing a surface of a disk-shaped glass plate with an acid washing liquid. The first washing step forms a surface layer on the surface of the glass substrate. The method further includes a step for grinding at least part of the surface layer with diamond abrasion grains to remove at least part of the surface layer, and a second washing step for washing the surface with a neutral or alkaline washing liquid.

DETAILED DESCRIPTION OF THE PREFERRED EMBODIMENTS

A glass substrate and a method for manufacturing the same according to an embodiment of the present invention will now be described.

Figure 1:
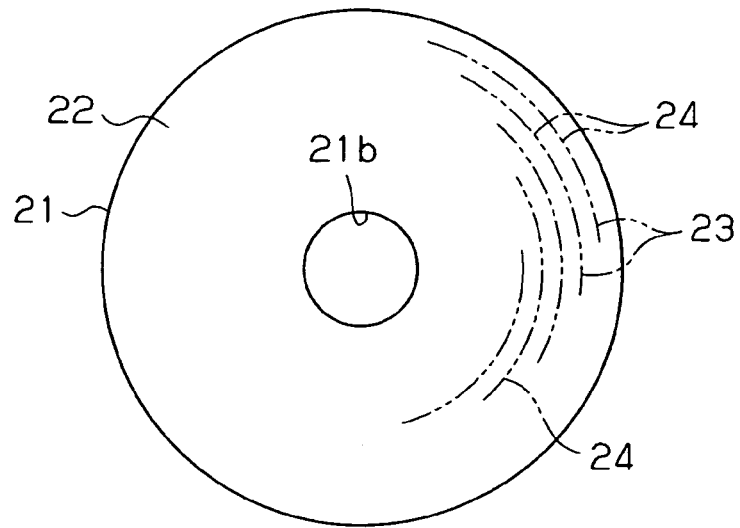
FIG. 1 is a plan view showing a glass substrate according to an embodiment of the present invention.

As shown in FIG. 1, an information recording medium glass substrate 21 is a disk having a center hole 21b. The glass substrate 21 is made of a multi-component glass material that contains silicon oxide and at least one of aluminum oxide and alkaline earth metal oxide.

Examples of multi-component glass materials include soda lime glass, aluminosilicate glass, borosilicate glass and crystallization glass that are fabricated through a float process, a down draw process, a redraw process, or a pressing process. The main components of soda lime glass include silicon dioxide ($SiO_2$), sodium oxide ($Na_2O$), and calcium oxide ($CaO$). The main components of aluminosilicate glass include $SiO_2$, aluminum oxide ($Al_2O_3$), and $R_2O$ (R is potassium (K), and sodium (Na) or lithium (Li). Examples of a crystallization glass include lithium oxide ($Li_2O$)—$SiO_2$ glass, $Li_2O$—$Al_2O_3$—$SiO_2$ glass, and RO—$Al_2O_3$—$SiO_2$ glass. RO represents alkaline earth metal oxide, and R represents magnesium (Mg), calcium (Ca), strontium (Sr), or barium (Ba).

A chemical strengthened glass fabricated by adding zirconium oxide ($ZrO_2$) or titanium oxide ($TiO_2$) to soda lime glass, aluminosilicate glass, borosilicate glass, or crystallization glass may be used as the multi-component glass material.

A plurality of films including a protective film and a magnetic film, which is made of metals or alloys of, for example, cobalt (Co), chromium (Cr), and iron (Fe), are formed on the surface 15 of the glass substrate 11 to manufacture the information recording medium. The information recording medium is rotatably supported in an information recorder such as a hard disk drive. The information recorder includes a head that records information on the information recording medium and reads information from the information recording medium.

The head moves along the surface of the rotating information recording medium to a position where the desired recording information is recorded (seek operation). To prevent noise from being produced and deficiencies, such as scratching of the information recording medium, from occurring, the ideal seek operation is performed in a state in which the head is levitated from the surface of the information recording medium. Accordingly, the glass substrate 21 must have high smoothness. Due to the increasing recording density over these recent years, it is required that the levitation height of the head from the surface of the information recording medium (touch down height, TDH) be less than 5 nm. The head momentarily contacts the surface of the information recording medium during the seek operation.

The surface roughness of the glass substrate 21, more specifically, the range of the arithmetic mean roughness Ra regulated under JIS B 0601 is preferably 0.1 to 1.5 nm, more preferably 0.1 to 1.0 nm, and most preferably 0.1 to 0.6 nm. The surface roughness Ra is measured using an atomic force microscope (AFM: manufactured by Digital Instruments, Inc.). If the surface roughness is greater than the above range, the surface 22 of the glass substrate 21 becomes rough, the smoothness becomes low, and deficiencies (glide errors) such as the head crashing against or being caught by protuberances formed on the surface 22 during the seek operation tend to occur. If the surface roughness Ra is less than 0.1 nm, the polishing time for manufacturing the glass substrate 21 is lengthened thereby decreasing yield and increasing the manufacturing cost of the glass substrate 21.

The maximum peak height Rp, which is regulated under JIS B 0601 and measured by an AFM, of the glass substrate 21 is preferably 10 nm or less. When the maximum peak height Rp exceeds 10 nm, abnormally tall protuberances (asperities) of the surface 22 of the glass substrate 21 tend to cause glide errors. Thus, the TDH cannot be decreased.

The ratio of Ra and Rp (Rp/Ra ratio) is preferably 10 or less. If the Rp/Ra ratio exceeds 10, the surface roughness becomes uneven and it becomes difficult for the head to pass over protuberances and asperities thereby resulting in glide errors apt to occurring.

Figure 2A:
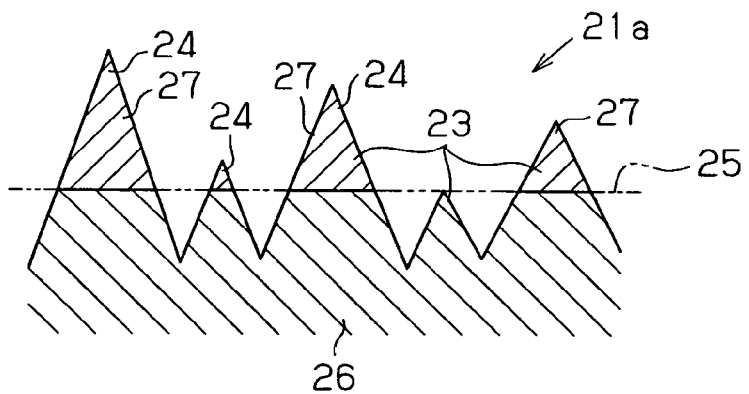
FIG. 2A is a partial cross-sectional view showing the surface of a glass plate subsequent to texture formation.
Figure 2B:
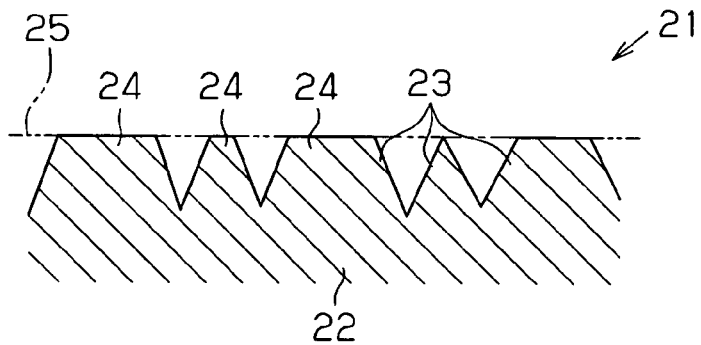
FIG. 2B is a partial cross-sectional view showing the surface of the glass substrate of the embodiment.

The surface 22 of the glass substrate 21 has a texture 23 including a plurality of projections 24. The projections 24 concentrically extend in the circumferential direction of the glass substrate 21. As shown in FIG. 2B, the peaks of the projections 24 are formed so that they do not exceed a reference line 25. Thus, the glass substrate 21 has superior smoothness, the head does not crash laterally against or become caught by the projections 24, and the occurrence of glide errors is suppressed.

When used as an information recording medium, the glass substrate (textured glass substrate) 21, of which surface 22 includes the texture 23, has a head contact area that is smaller than that of a glass substrate having a smooth or extremely smooth surface. Thus, the textured glass substrate 21 suppresses adhesion between the surface of the information recording medium and the head that would be caused by a viscous material, such as lubrication oil, applied to the surface of the information recording medium.

In this manner, sticking and glide errors may be suppressed. This enables the TDH to be further decreased. In other words, the glass substrate 21 is optimal for increasing the recording density of the information recording medium.

A method for manufacturing the glass substrate 21 will now be described.

Figure 3:
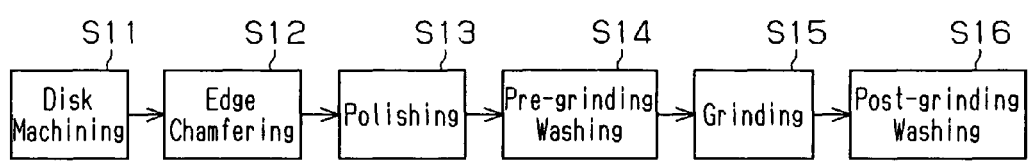
FIG. 3 is a flowchart showing a process for manufacturing a glass substrate according to an embodiment of the present invention.

FIG. 3 is a flowchart showing the method for manufacturing the glass substrate 21. The manufacturing method includes a disk machining process S11, an edge chamfering process S12, a polishing process S13, a pre-grinding washing process (first washing) S14, a grinding process S15, and a post-grinding washing process (second washing) S16.

In the disk machining process S11, a cutter made of cemented carbide alloy or diamond is used to cut a sheet of a multi-component glass material and obtain a glass plate 21a having a center hole 21b.

In the edge chamfering process S12, the glass plate 21a is ground to obtain the predetermined outer diameter and inner diameter. Further, the corners at the inner and outer circumferences are chamfered by performing polishing.

In the polishing process S13, the surface of the glass plate 21a is polished and smoothed. It is preferred that the polishing process S13 be performed in two stages, a former stage polishing process and a latter stage polishing process. The former stage polishing process removes warps, undulations, and deficiencies such as irregularities and cracks, so that the surface of the glass plate 21a is flat and has an even thickness. In the former stage polishing process, an abrasive of which grain diameter is relatively coarse is used. Further, either a polishing pad is not used or one that is hard and coarse is used.

In the latter stage polishing process, the glass substrate is polished so as to satisfy the surface smoothness required for an information recording medium. The surface roughness of the glass plate 21a subsequent to the latter stage polishing process is equivalent to that of the glass substrate 21. That is, the glass plate 21a is polished until the arithmetic mean roughness Ra becomes 1.5 nm or less.

The abrasive used in the latter stage polishing process has a relatively fine grain diameter and high affinity with respect to glass material and is, for example, a rare earth oxide, such as cerium oxide or lanthanum oxide, or colloidal silica. It is preferred that the polishing pad be made of a soft and fine material such as, synthetic resin foam or suede.

The former stage polishing process and the latter stage polishing process may each be divided into further plural stages to improve the polishing efficiency and surface smoothness of the glass plate 21a.

In the pre-grinding washing process S14, the surface of the polished glass plate 21a is washed with a washing liquid. This removes adhered substances, such as the abrasive of cerium oxide or colloidal silica that is chemically adhered to the surface in a firm manner and iron particles caught in the surface. In the pre-grinding washing process S14, the glass plate 21a is first immersed in a strong acid washing liquid (strong acid solution). This dissolves only the adhered substances, such as the abrasive or iron particles, or part of the surface of the glass plate 21a together with the adhered substances in the strong acid solution and removes most of the adhered substances from the surface of the glass plate 21a. Then, the glass plate 21a is immersed in a strong alkaline solution (strong alkaline washing liquid). This charges the glass plate 21a and the adhered substances on the glass plate 21a to the same polarity to cause electrostatic repulsion and removes the adhered substances from the glass plate 21a.

Figure 5A:
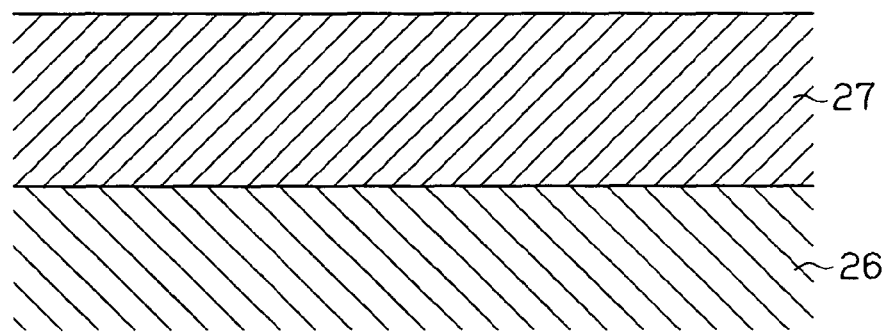
FIG. 5A is a cross-sectional view showing the glass plate in which the surface layer is formed.

As shown in FIG. 5A, immersion in the strong acid solution in the pre-grinding washing process S14 deforms the glass. The composition of a layer (surface layer) 27 near the surface of the deformed glass plate 21a differs from the composition of an inner portion 26 of the glass plate 21a, or the portion 26 excluding the surface layer 27. The chemical resistance of the surface layer 27 is lower than that of the inner portion 26.

The reason the surface layer 27 is formed will now be described.

Contact with the strong acid solution causes alkaline earth metal oxides and aluminum oxides near the surface of the glass plate 21a to dissolve into the strong acid solution as alkaline earth metal ions and aluminum ions. The ion radii of the alkaline earth metal ions and aluminum ions are relatively large. Thus, large voids are formed in the molecular frame of the glass at the surface of the glass plate 21a from which the alkaline earth metal ions and aluminum ions are removed. When such surface of the glass plate 21a comes into contact with chemicals, such as the acid solution or the alkaline solution, other ions derived from the chemicals enter the voids thereby affecting the Si—O bonding in the glass molecules near the surface. Accordingly, the chemical resistance, that is, acid resistance and alkaline resistance, of the surface layer 27 is decreased.

After contact with the acid washing liquid, processing is performed with the alkaline washing liquid to adjust the thickness and deformation level of the surface layer 27. Accordingly, the surface layer 27 is not formed with excessive thickness. More specifically, contact with the strong alkaline solution uniformly etches the surface layer having low chemical resistance to remove the excessively deformed portion of the surface layer 27 and remove part of the surface layer 27 to obtain the desired thickness.

Change in the immersion time of the surface layer 27 in the washing liquid adjusts the penetration level of the strong acid and strong alkaline solutions in the glass plate 21a. This adjusts the thickness and deformation level of the surface layer 27.

It is preferred that strong acid solution having a pH of 3.0 or less be used. When the pH exceeds 3.0, adhered substances cannot be sufficiently removed from the surface of the glass plate 21a, and a glass plate 21a having high cleanness cannot be obtained. As the strong acid liquid, at least one selected from hydrofluoric acid, fluosilicic acid, sulfuric acid, hydrochloric acid, sulfamic acid, acetic acid, tartaric acid, citric acid, gluconic acid, malonic acid, and oxalic acid may be used.

It is preferred that a strong alkaline solution having a pH of 10.5 or greater be used. If the pH is less than 10.5, the removal of the adhered substances from the surface of the glass plate 21a becomes insufficient. Further, uniform etching of the surface layer 27 becomes difficult. As the strong alkaline solution, at least one selected from a non-organic alkaline solution, such as a potassium hydroxide solution, a sodium hydroxide solution, or ammonia water, and an organic solution, such as tetraammonium hydride, may be used.

Figure 5B:
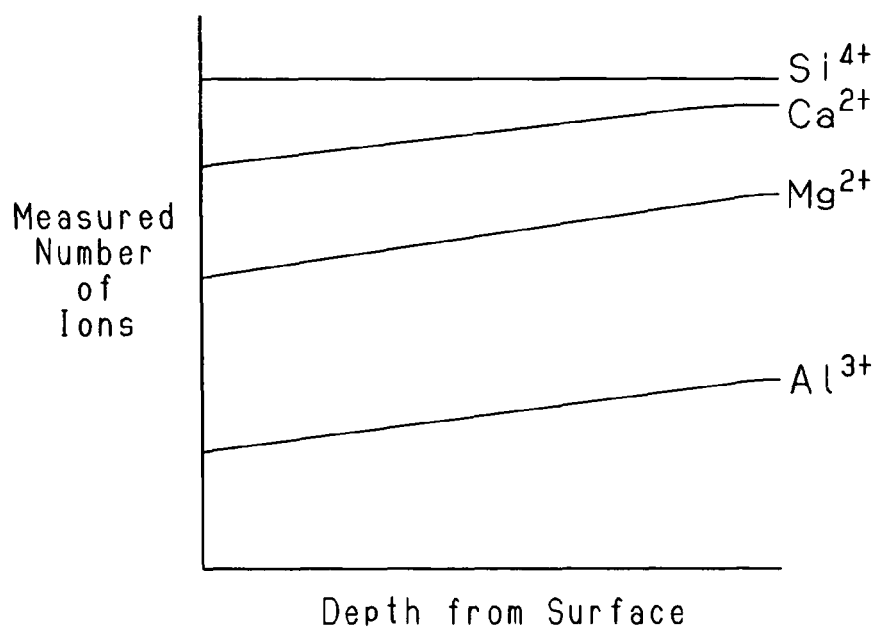
FIG. 5B is a graph showing the relationship between the depth and composition of the glass substrate.

FIG. 5B is a graph showing depths from the surface of the aluminosilicate glass subsequent to the pre-grinding washing process and the number of ions for each type of component measured by a secondary ion mass spectrometer It is apparent from the measurement results that the number of calcium ions ($Ca^{2+}$) and magnesium ions ($Mg^{2+}$), which are alkaline earth metal ions, and aluminum ions ($Al^{3+}$) decreases at positions closer to the surface of the glass plate 21a. That is, the calcium ions, magnesium ions, and aluminum ions in the surface layer 27 are less than that in the inner portion 26. As for silicon ions ($Si^{4+}$) derived from silicon oxide, the number of ions is the same in the inner portion 26 and the surface layer 27. Accordingly, the content of silicon oxide in the surface layer 27 is relatively increased with respect to the inner portion 26 by the decrease of $Ca^{2+}$, $Mg^{2+}$, and $Al^{3+}$.

More specifically, it is preferred that the ingredient ratio of silicon oxide in the glass composition of the surface layer 27 relative to the ingredient ratio of silicon oxide in the glass composition of the inner portion 26 be greater by more than 1.0 times but less than or equal to 1.2 times. If the ingredient ratio of silicon oxide in the surface layer 27 becomes greater than the ingredient ratio of the inner portion 26 by 1.2 times, the chemical resistance excessively decreases. Further, when the glass plate 21a is immersed in the strong alkaline solution, the surface of the glass plate 21a is not uniformly etched and becomes rough. This may decrease smoothness.

In the grinding process S15, the surface of the glass plate 21a is ground to remove at least part of the surface layer subsequent to the washing process S14. Further, the texture 23 is formed in the grinding process S15. In the grinding process S15, a texture machine, which is normally used to perform texture processing on an aluminum substrate, is used.

The texture machine will now be described.

Figure 4:
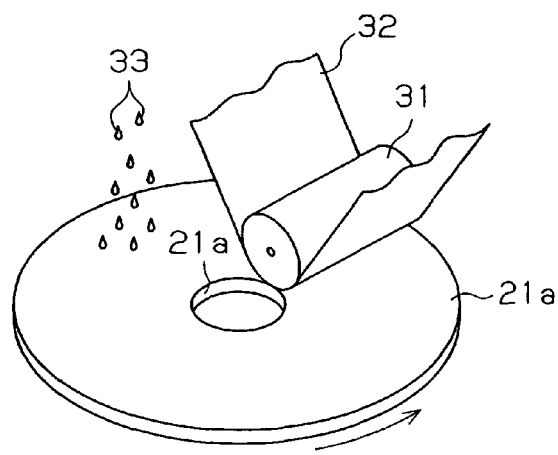
FIG. 4 is a perspective view showing the glass plate undergoing a process for forming a texture.

As shown in FIG. 4, a roller 31 is rotatably supported immediately above the glass plate 21a. The roller 31 has a length that is substantially equal to the radius of the glass plate 21a and extends in the radial direction of the glass plate 21a. A tape 32, which functions as a scrub member, is arranged between the roller 31 and the glass plate 21a to pass from one side of the roller 16, into the space between the glass plate 21a and the roller 31, and out of the other side of the roller 16. The pressure of the roller 31 presses the tape 32 against the surface 15 of the glass plate 21a as the tape 32 passes through the space between the glass plate 21a and the roller 31. Further, an abrasive 33 is dropped on the surface of the glass plate 21a. As the glass plate 21a rotates in the direction of the arrow in FIG. 4, the tape 32 slides along the surface of the glass plate 21a, and the surface is ground while being controlled in a satisfactory manner to form the texture 23.

The material of the tape 32 is not particularly limited, and any material, such as a tape-shaped cloth, non-woven cloth, or flocked article of polyethylene fibers or the like may be used as long as it can be used to form such type of texture. The abrasive 33 is obtained by dispersing abrasion grains in a dispersion solvent such as water. In addition to rare earth oxides and colloidal silica, diamond abrasion grains may be used as the abrasion grains. The preferred abrasion grains are diamond abrasion grains that do not easily adhere to the surface of the glass plate 21a and do not chemically affect the glass plate 21a. The grain diameter and shape of the diamond abrasion grains is determined in accordance with the required density of the texture 23. The average grain diameter ($D_{50}$) of the diamond abrasion grains is preferably 0.05 to 0.3 μm, and more preferably 0.08 to 0.25 μm. If $D_{50}$ is less than 0.05 μm, the capability of polishing the glass plate 21a is insufficient. This decreases the yield of the glass substrate 21 and increases the processing cost. If $D_{50}$ exceeds 0.3 μm, projections 24 having a large height difference are formed. This roughens the surface of the glass plate 21a.

The texture machine rotates the glass plate 21a in the direction of the arrow in FIG. 4 so that the tape 32 slides along and grinds the surface of the glass plate 21a. As shown in FIG. 2A, most of the surface layer 27 is removed from the glass plate 21a after the grinding that forms the texture 23, which includes the projections 24 on the surface. The surface layer 27 that was not removed remains on the upper portion of some of the projections 24.

This thickness of the surface layer 27 remaining on the surface of the glass plate 21a after the grinding process S15 is preferably 3 nm or less. If the residual surface layer 27 is too thick, the surface layer 27 will be unevenly etched in the post-grinding washing process S16 thus roughening the surface 22 of the glass substrate 21. The lower limit of the thickness of the residual surface layer 27 is 0 nm.

In the grinding process S15, the removal thickness (grinding amount) is preferably 0.5 nm or greater. When the grinding amount is less than 0.5 nm, the surface layer 27 remaining on the surface of the glass plate 21a after the grinding has a thickness of more than 3 nm. This roughens the surface 22 of the glass substrate 21, which is obtained as described above. The grinding amount refers to the amount calculated by subtracting the thickness of the glass plate 21a subsequent to grinding from the thickness of the glass plate 21a prior to grinding. Thus, the grinding amount as used here does not refer to an amount representing the average height of the projections 24 forming the texture 23. The upper limit of the grinding amount is equal to the thickness of the surface layer 27 immediately after the pre-grinding washing process S14. When the grinding amount exceeds the thickness of the surface layer 27, the grinding for removing the surface layer 27 may scratch the surface of the glass plate 21a. This would lower the smoothness of the glass substrate 21.

In the post-grinding washing process S16, abrasion grains and dust is removed from the surface of the glass plate 21a to increase the cleanness of the glass substrate 21. For example, the glass plate 21a may be immersed into a washing liquid so that abrasion grains and dust are washed off from the surface of the glass plate 21a and dispersed in the washing liquid.

In the post-grinding process S16, a neutral or alkaline washing liquid is used so that the glass plate is not chemically affected by the liquid. The alkaline solution used for process S14 may be used as the alkaline washing liquid. Examples of a neutral washing liquid are water; pure water; alcohol such as isopropyl alcohol; electrolytic water obtained by performing electrolysis on a solution of a non-organic salt such as an alkaline metal salt like sodium chloride; or a neutral solution such as functional water like gas dissolved water in which gas is dissolved. There are two types of electrolytic water, one obtained at the anode side during electrolysis and the other obtained at the cathode side. Any of these two types may be used as the washing liquid.

As described for the grinding process, to prevent the surface 22 of the glass substrate 21 from becoming rough, the surface layer 27 having a thickness of 3 nm or less remains on the surface of the glass plate 21a that has undergone grinding. To remove the surface layer 27 in a substantially complete manner in the post-grinding washing process S16, it is preferred that an alkaline washing liquid be used to etch only the surface layer 27 and prevent the inner portion 26 from being affected by the liquid. The preferred washing liquid is an alkaline washing solution having a pH of 11.0 to 13.0. If the pH is less than 11.0, the surface layer 27 may not be sufficiently removed. If the pH exceeds 13.0, the inner portion 26 may be etched in addition to the surface layer 27. Further, the surface layer 27 may not be evenly etched thereby roughening the surface 22.

To improve the washing effect in the post-grinding washing process S16, a builder, such as a surfactant, a chelating agent, and an organic solvent, may be added to the washing liquid.

As described above, when using an alkaline washing liquid in the post-grinding washing process, the surface layer 27 has a low chemical resistance. Thus, the surface layer 27 is selectively dissolved and removed by the washing liquid. As shown in FIGS. 2A and 2B, the surface layer 27 remains on the upper portion of the projections 24. This enables the height of each projection 24 to be the same as the reference line 25, which is the boundary between the surface layer 27 and the inner portion 26. Further, the abrasive, iron particles, and abrasion grains caught in or firmly adhered to surface of the surface layer 27 are completely removed in the post-grinding washing process S16. Accordingly, the surface of the glass substrate 21 according to the present invention has both high cleanness and superior smoothness.

The embodiment has the advantages described below.

In the method for manufacturing the glass substrate 21, the disk machining process S11, the edge chamfering process S12, the polishing process S13, the pre-grinding washing process S14, the grinding process S15, and the post-grinding washing process S16 are sequentially performed. The strong acid solution used in the pre-grinding washing process S14 removes adhered substances from the surface of the glass plate 21a and forms the surface layer 27 so that it has low chemical resistance. During the grinding process, the surface of the glass plate 21a is ground so that the surface layer 27 is thinner than the predetermined thickness. This prevents the washing liquid from unevenly etching the surface layer 27. Accordingly, the manufactured glass substrate 21 has both high cleanness and superior smoothness.

In the grinding process S15, the surface of the glass plate 21a is ground to a depth of 0.5 nm or greater from the surface of the glass plate 21a so that the remaining surface layer 27 has a thickness of 3 nm or less subsequent to grinding. In this manner, the grinding amount is adjusted to prevent the surface layer 27 from excessively remaining on the surface of the glass plate 21a subsequent to grinding. The washing subsequent to grinding prevents uneven etching of the surface layer 27. Thus, a smooth glass substrate 21 is manufactured.

The ingredient ratio of silicon oxide in the surface layer 27 relative to the ingredient ratio of silicon oxide in the glass composition of the inner portion 26 is greater by more than 1.0 times but less than or equal to 1.2 times. This prevents the chemical resistance of the surface layer 27 from being excessively decreased. Thus, the surface of the glass plate 21a is prevented from being rough due to washing.

In the pre-grinding washing process S14, a strong acid solution washing liquid is used. Thus, alkaline earth metal ions or aluminum ions are selectively dissolved from the surface of the glass plate 21a. This obtains the surface layer 27 with a content amount of silicon oxide that is relatively greater than that of the inner portion 26. Change in the contact time of the glass plate 21a with the washing liquid facilitates adjustment of the chemical resistance of the surface layer 27.

The grinding process S15, which uses a texture machine, is performed by sliding the tape 32 in the circumferential direction of the glass plate 21a. This ensures the formation of the projections 24, which extend in the circumferential direction. Thus, the glass substrate 21 is manufactured with a high yield and the occurrence of glide errors is prevented even when the head moves near by.

Examples of the present invention and comparative examples will now be described.

EXAMPLE 1

A glass plate having a size with a thickness of 0.6 mm, an outer diameter of 65 mm, and an inner diameter of 20 mm was prepared from an aluminosilicate glass sheet. The composition of the aluminosilicate glass sheet was $SiO_2$ 63 mol %, $Al_2O_3$ 16 mol %, $Na_2O$ 11 mol %, $Li_2O$ 4 mol %, MgO 2 mol %, and CaO 4 mol %. Then, the pre-grinding washing process S14 was performed. The glass plate was immersed in hydrofluoric acid having a concentration of 0.01% for three minutes under a temperature of 35° C. and then immersed in a potassium hydroxide solution (KOH) having a concentration of 0.01% for three minutes under a temperature of 35° C.

The two surfaces of the glass plate were then ground. In the grinding, an abrasive containing diamond abrasion grains was used, and the glass plate was ground for a grinding amount of 2 nm without forming the texture. After the grinding, a surface layer having a thickness of 2 nm remained in the surface of the glass plate. The glass plate was immersed in a potassium hydroxide solution having a concentration of 1% for three minutes under a temperature of 35° C. to perform the post-grinding washing. The glass substrate of example 1 was obtained in this manner.

An AFM was used to measure the Ra on the surface of the glass substrate at ten or more locations. The field of vision was 10 μm×10 μm. The deviation rate of Ra was calculated from a totality mean value of RA for all of the measurement locations and an individual mean value of Ra for each field of vision. The deviation rate is the ratio of the number of measurement locations in which the individual mean value differs by 0.1 nm or greater relative to the totality mean value with respect to the number of all of the measurement locations. For example, when 10 locations on the surface of the glass substrate are measured and the individual mean value differs from the totality mean value by 0.1 nm or greater at three locations, the deviation rate is 30%. In other words, a higher deviation rate of Ra indicates that the surface of the glass substrate is rough, and a low deviation rate indicates that the glass substrate is smooth. In example 1, the deviation rate of Ra was less than or equal to 3%. Further, TDH was 4 nm. Accordingly, the glass substrate of example 1 was a glass substrate having satisfactory smoothness and a low levitation height.

EXAMPLE 2

A glass substrate was obtained in example 2 through the same method as example 1 except in that the grinding amount was 4 nm and the thickness of the surface layer was 1 nm. In example 2, the deviation rate of Ra was less than or equal to 2%, and TDH was 3.5 nm. Accordingly, the glass substrate of example 2 was a glass substrate having satisfactory smoothness and a low levitation height.

EXAMPLE 3

A potassium hydroxide solution having a concentration of 0.02% was used when performing pre-grinding washing, and a potassium hydroxide solution having a concentration of 2% was used in the post-grinding washing. Otherwise, a glass plate was processed in the same manner as in example 1 to obtain a glass substrate in example 3.

Texture Formation Conditions
Material of tape: polyester
Tension of tape: 22.1 N
Velocity of tape: 7.6 cm/min
Pressing force of roller: 30.9 N
Rotation speed of glass plate: 300 rpm
Supply amount of diamond slurry: 20 ml/min
Grain diameter of diamond abrasion grains: 0.2 μm The Ra deviation rate of the glass substrate was less than or equal to 3% and TDH was 2.5 nm. Comparing this with the result of example 1, the deviation rate of Ra was the same but TDH was smaller. This shows that the formation of the texture enables stable manufacturing of a satisfactory glass plate having a low levitation height.

COMPARISON EXAMPLE 1

A glass plate was processed in the same manner as in example 1, except in that grinding was not performed, to obtain the glass substrate of comparative example 1. The thickness of the surface layer was 5 nm. The deviation rate of Ra for the glass substrate of comparative example 1 was greater than or equal to 15% and TDH was 5 nm. Comparing this to the glass plate of example 1, the deviation rate of Ra increased and the TDH was greater. Thus, when grinding is not performed, the surface layer is unevenly etched. This decreases smoothness and hinders the decreasing of TDH and thus is not preferable.

The embodiment and examples may be modified as described below.

As described in the examples, as long as part of the surface layer 27 is removed, the texture 23 does not have to be formed during grinding. When the texture is not formed during grinding, the grain diameter and shape of the diamond abrasion grains may appropriately be selected when forming the texture during grinding to grind the projections 24 having a height that is less than the thickness of the surface layer 27. This facilitates manufacturing and improves the yield of the glass substrate.

If necessary, the glass plate 21a may be washed after at least any one of the disk machining process S11, the edge chamfering process S12, the polishing process S13, the pre-grinding washing process S14, the grinding process S15, and the post-grinding washing process S16. This washing includes washing for removing adhered substances, such as abrasion grains, iron particles, and dust, from the surface of the glass plate 21a, and washing for removing the washing liquid remaining on the surface of the glass plate 21a. The acid solution, alkaline solution, and neutral solution described above may be used for the washing.

A chemical strengthening process may be performed between any one of the disk machining process S11, the edge chamfering process S12, the polishing process S13, the pre-grinding washing process S14, the grinding process S15, and the post-grinding washing process S16. In the chemical strengthening process, the surface of the glass plate 21a undergoes a chemical strengthening treatment to improve the impact resistance characteristic, the vibration resistance characteristic, thermal resistance characteristic, and etc. that are required for an information recording medium. In the chemical strengthening treatment, monovalent metal ions contained in the glass composition, such as lithium ions or sodium ions, are ion converted to monovalent metal ions having a greater ion radius, such as sodium ions or potassium ions. The chemical strengthening treatment forms a compression stress layer on the surface of the glass plate 21a and chemically strengthens the surface. The chemical strengthening treatment is performed by immersing the glass plate 21a in a chemical strengthening liquid in which potassium nitrate ($KNO_3$), sodium nitrate ($NaNO_3$), silver nitrate ($AgNO_3$), and etc. are heated and melted. The chemical strengthening treatment is preferably performed under a temperature of about 50 to 150° C. lower than the strain point of the glass material that is used, and more preferably, the temperature of the chemical strengthening liquid is about 350 to 400° C.

The glass material of the glass substrates in examples 1 to 3 is an aluminosilicate glass of which glass composition contains alkaline earth metal oxide and aluminum oxides. However, the glass material is not limited in such manner and soda lime glass, borosilicate glass, or crystallization glass may be used. The soda lime glass, borosilicate glass, and crystallization glass do not have to include any aluminum oxides or may include just a slight amount of oxides. When using these glass materials, the surface layer is formed by the alkaline earth metal ions of the alkaline earth metal oxides dissolved out of the glass composition.

The surface layer 27 does not have to be formed by removing alkaline earth metal ions or aluminum ions and may be formed by removing alkaline metal ions such as potassium ions, sodium ions, and lithium ions.

In the grinding process S15, any device may be used as long as it rubs the surface of the glass plate 21a and grinds off the surface layer 27. When removing the surface layer through grinding, it is preferred that a device that rubs the surface of the glass plate 21a in the circumferential direction, which is the movement direction of the head, be used. This is because TDH may be decreased by grinding the surface of the glass plate 21a in the circumferential direction. The preferred device is a scrub machine. A scrub machine is a device that rubs the surface of the glass plate with a rotatably supported synthetic resin scrub member or foam scrub member (scrub material).

The invention claimed is:

1. A method for manufacturing a glass substrate for an information recording medium, the manufacturing method comprising:
   a pre-grinding first washing step for washing a surface of a polished disk-shaped glass plate with a strong acid washing liquid, wherein the strong acid washing liquid alters the glass substrate to form an altered surface layer on an inner portion of the glass plate, wherein the strong acid washing liquid decreases a chemical resistance of the altered surface layer;
   a pre-grinding second washing step for washing the surface with a strong alkaline washing liquid, wherein the strong alkaline washing liquid removes a part of the altered surface layer, wherein a thickness of the altered surface layer is controlled by a washing time of the surface in the strong acid washing liquid and in the strong alkaline washing liquid;
   subsequent to both the first washing step and the second washing step, a step for grinding the altered surface layer for a depth of 0.5 nm or more with abrasion grains so that the altered surface layer has a thickness of 3 nm or less, wherein the grinding of the altered surface layer forms a texture including projections on the surface of the glass plate;
   subsequent to the grinding step, a post-grinding washing step for washing the surface with an alkaline washing liquid, wherein the alkaline washing liquid removes a remaining portion of the altered surface layer from the inner portion without affecting the inner portion.

2. The manufacturing method according to claim 1, wherein the grinding step includes scrubbing the surface with a scrub member in a circumferential direction of the glass plate while supplying the surface with diamond abrasion grains.

3. The manufacturing method according to claim 1, wherein the pre-grinding first washing step includes immersing the polished glass plate in the strong acid washing liquid and then immersing in the strong alkaline washing liquid in the pre-grinding second washing step.

4. The manufacturing method according to claim 1, wherein the step for grinding is a texture formation step for forming a texture on the surface of the glass plate.

5. The manufacturing method according to claim 1, wherein the pre-grinding first washing step, the pre-grinding second washing step, the step for grinding, and the post-grinding washing step are controlled to adjust the a thickness of the altered surface layer finally remained on the glass plate.

6. The manufacturing method according to claim 1, wherein the pre-grinding first washing step, the pre-grinding second washing step, the step for grinding, and the post-grinding washing step are sequentially performed.

7. The manufacturing method according to claim 1, wherein the glass substrate is made of a multi-component glass material selected from the group consisting of soda lime glass, aluminosilicate glass, borosilicate glass and crystallization glass.

8. The manufacturing method according to claim 1, wherein a chemical strengthening process is performed between any one of the pre-grinding first washing step, the pre-grinding second washing step, the step for grinding, and the post-grinding washing step.

9. The manufacturing method according to claim 1, wherein the pre-grinding first washing step includes immersing the polished glass plate in the strong acid washing liquid having a pH of 3.0 or less and the pre-grinding second washing step includes immersing the polished glass plate in the strong alkaline washing liquid having a pH of 10.5 or greater.

10. The manufacturing method according to claim 9, wherein the immersing in the strong acid washing liquid and the immersing in the strong alkaline washing liquid are performed for the same immersion time period under the same temperature.

11. The manufacturing method according to claim 10, wherein the pre-grinding washing step includes immersing the polished glass plate in 0.01% of a hydrofluoric acid solution for three minutes under a temperature of 35° C. and then immersing in 0.01% of a potassium hydroxide solution for three minutes under a temperature of 35° C.

12. The manufacturing method according to claim 1, wherein a deviation rate of surface roughness Ra of the glass substrate is less than or equal to 3%.

13. The manufacturing method according to claim 1, wherein the pre-grinding first washing step includes immersing the polished glass plate in the strong acid washing liquid and subsequently in the strong alkaline washing liquid in the pre-grinding second washing step for the same immersion time period under the same temperature with the strong acid washing liquid and the strong alkaline washing liquid having the same concentration.

14. A method for manufacturing a glass substrate for an information recording medium, the manufacturing method comprising:
   preparing a disk-shaped glass plate containing silicon oxide, aluminum oxide, and alkaline earth metal oxide with a uniform chemical composition;
   polishing the glass plate to form a smooth surface;
   immersing the polished glass plate in a strong acid solution to form an altered surface layer on an inner portion, wherein an ingredient ratio of at least one of aluminum oxide and alkaline earth metal oxide is decreased in the altered surface layer compared to the inner portion;

subsequent to immersing the polished glass plate in the strong acid solution, immersing the polished glass plate in a strong alkaline solution, wherein the strong alkaline solution removes a part of the altered surface layer;

subsequent to immersing the polished glass plate in the strong acid solution and in the strong alkaline solution, removing at least part of the altered surface layer with an abrasive to such that the altered surface layer has a thickness of 3 nm or less;

uniformly etching the altered surface layer having a thickness of 3 nm or less while washing off the abrasive with an alkaline washing liquid wherein the inner portion is unaffected by the alkaline washing liquid.

15. The manufacturing method according to claim 14, wherein the strong acid solution has a pH of 3.0 or less.

16. The manufacturing method according to claim 15, wherein the strong alkaline solution has a pH value of 10.5 or greater.

17. The manufacturing method according to claim 14, further comprising removing adhered substances that are adhered on the smooth surface.

18. The manufacturing method according to claim 14, wherein the alkaline washing liquid used in said etching is an alkaline solution having a pH of 11.0 to 13.0.

19. The manufacturing method according to claim 14, wherein said immersing, said removing, and said uniformly etching are controlled to adjust a thickness of the altered surface layer remaining on the glass plate.

20. The manufacturing method according to claim 14, wherein the immersing step, the removing step and the uniformly etching step are sequentially performed.

21. The manufacturing method according to claim 14, wherein a deviation rate of surface roughness Ra of the glass substrate is less than or equal to 3%.

22. The manufacturing method according to claim 14, wherein the immersing steps includes immersing the polished glass plate in the strong acid solution and subsequently in the strong alkaline solution for the same immersion time period under the same temperature with the strong acid solution and the strong alkaline solution having the same concentration.

* * * * *